(12) United States Patent
Sara et al.

(10) Patent No.: US 9,442,878 B2
(45) Date of Patent: Sep. 13, 2016

(54) PARALLEL SNOOP AND HAZARD CHECKING WITH INTERCONNECT CIRCUITRY

(71) Applicant: ARM LIMITED, Cambridge (GB)

(72) Inventors: Daniel Sara, Sheffield (GB); Andrew David Tune, Sheffield (GB)

(73) Assignee: ARM Limited, Cambridge (GB)

( * ) Notice: Subject to any disclaimer, the term of this patent is extended or adjusted under 35 U.S.C. 154(b) by 226 days.

(21) Appl. No.: 14/255,352

(22) Filed: Apr. 17, 2014

(65) Prior Publication Data

US 2015/0302193 A1    Oct. 22, 2015

(51) Int. Cl.
*G06F 12/00*    (2006.01)
*G06F 13/42*    (2006.01)

(52) U.S. Cl.
CPC ................... *G06F 13/4221* (2013.01)

(58) Field of Classification Search
CPC .................................................. G06F 13/4221
See application file for complete search history.

(56) References Cited

U.S. PATENT DOCUMENTS

| | | | |
|---|---|---|---|
| 6,330,645 B1 | 12/2001 | Harriman | |
| 2003/0159013 A1 | 8/2003 | Frank et al. | |
| 2007/0022277 A1 | 1/2007 | Iwamura et al. | |
| 2010/0211714 A1 | 8/2010 | LePage | |
| 2010/0250802 A1* | 9/2010 | Waugh | G06F 13/4022 710/100 |
| 2012/0331197 A1 | 12/2012 | Campbell et al. | |
| 2013/0042077 A1* | 2/2013 | Mannava | G06F 12/0831 711/146 |
| 2013/0103903 A1 | 4/2013 | Rajagopalan et al. | |
| 2014/0095809 A1* | 4/2014 | Moll | G06F 12/0831 711/146 |

OTHER PUBLICATIONS

UK Search Report dated Oct. 28, 2014 in GB 1406943.9, 3 pages.
UK Search Report dated Nov. 7, 2014 in GB 1406946.2, 3 pages.
U.S. Appl. No. 14/628,331, filed Feb. 23, 2015, Andrew David Tune et al.
U.S. Appl. No. 14/628,335, filed Feb. 23, 2015, Arthur Laughton et al.

* cited by examiner

*Primary Examiner* — Gurtej Bansal
(74) *Attorney, Agent, or Firm* — Nixon & Vanderhye P.C.

(57) ABSTRACT

A system-on-chip integrated circuitry includes interconnect circuitry for connecting transaction sources with transaction destinations. A buffer circuit buffers a plurality of access transactions received from the transaction sources before they are passed on to respective transaction destinations. Hazard checking circuitry, such as identifier reuse circuitry, performs hazard checks for access transactions in parallel with snoop operations performed by snoop circuitry for managing coherence between data values stored within the plurality of cache memories. The snoop circuitry includes snoop reordering circuitry for permitting reordering of snoop responses. The snoop circuitry may issue a snoop request for a given access transaction in parallel with the hazard checking circuitry performing one or more hazard checks for that transaction.

8 Claims, 8 Drawing Sheets

PARALLEL SNOOP AND HAZARD CHECKING WITH INTERCONNECT CIRCUITRY

BACKGROUND

This invention relates to the field of data processing systems. More particularly, this invention relates to interconnect circuitry and hazard checking circuitry for performing hazard checks upon access transactions passing between transaction sources and transaction destinations via the interconnect circuitry.

It is known to provide interconnect circuitry for communicating access transactions between one or more transaction sources and one or more transaction destinations. The transactions may take a variety of different forms, such as data read transactions, data write transactions, cache maintenance/management transactions etc. As system-on-chip integrated circuits increase in complexity the interconnect circuitry also increases in complexity and becomes a significant factor in contributing to the overall performance of the system. The interconnect circuitry should allow the communication of the access transactions as desired between different sources and destinations whilst preventing hazards causing erroneous operation, such as transaction ordering violations, a breakdown in coherence between different copies of the same data values held at different places within the system, etc. Measures which can increase the efficiency of the interconnect circuitry, in terms of its speed of operation, the latency it imposes upon an access transaction, the energy consumed in communicating an access transaction, etc. are advantageous.

SUMMARY

Viewed from one aspect the present invention provides interconnect circuitry for communicating access transactions between one or more transaction sources and one or more transaction destinations, said interconnect circuitry comprising:

buffer circuitry configured to buffer a plurality of access transactions received from said one or more transaction sources before said plurality of access transactions are sent to respective ones of said one or more transaction destinations;

hazard checking circuitry coupled to said buffer circuitry and configured to perform one or more hazard checks upon said plurality of access transactions buffered within said buffer circuitry such that at least some of said plurality of access transactions are constrained to issue from said buffer circuitry in accordance with a predetermined order within said at least some of said plurality of access transactions; and snoop circuitry configured to perform snoop operations to manage coherence between data values stored within a plurality of cache memories coupled to said interconnect circuitry, said snoop circuitry issuing at least some snoop requests in a given order and operating such that corresponding snoop responses are returned from said snoop circuitry in said given order;

wherein said snoop circuitry includes snoop reordering circuitry configured to permit reordering of snoop responses received from one or more of said cache memories to match said given order; and said snoop circuitry is configured to issue a snoop request for a given access transaction in parallel with said hazard checking circuitry at least performing said one or more hazard checks for said given access transaction.

The present technique recognises that the snoop operations may be performed in parallel with one or more other hazard checking operations so as to reduce latency associated with communicating through the interconnect circuitry. More particularly, the snoops have the property that at least some of the snoops (e.g. snoops to the same cache) need to be performed in a given order and that the provision of snoop reordering circuitry which permits reordering of snoop responses allows sufficient flexibility to permit the hazard checking to be performed in parallel with the snoop operations without either causing deadlocks.

In some embodiments when the hazard checking circuitry determines that a given access transaction is not ready to be issued from the reorder buffer in accordance with the predetermined order associated with that hazard checking, then the corresponding snoop response may be stalled within the snoop circuitry. The snoop reordering circuitry permits other snoop responses to be returned ahead of the stalled response in a manner which avoids an undue impact of the stalled snoop response upon the overall system performance. The stalled snoop response can merely await the hazard checking for that access transaction to be passed. At one level, it will be seen that the snoop processing is speculatively performed (or at least initiated) while the hazard checking has yet to be completed. If necessary, the return of the snoop response which will complete the snoop processing can be stalled until the hazard checking has been performed and any hazard identified cleared by a subsequent rerun of the hazard check.

The snoop reordering circuitry may permit the reordering of some but not all snoop responses. In particular, snoop responses to a same cache memory for which a snoop response has stalled may not be reordered in at least some embodiments.

It will be appreciated that the hazard checking performed can take a variety of different forms. One example form is identifier-reuse checking in which an identifier associated with a transaction source is checked for reuse so as to enforce an appropriate ordering upon transactions received into the buffer.

A further level of hazard checking may be one which checks for inappropriate reuse of transaction destination identifiers. An ordering may be enforced by such hazard checking circuitry in respect of access transactions that share a common of a transaction source identifier and also share a common view of a transaction destination identifier.

In some embodiments the buffer into which the access transactions are stored may be a reorder buffer which permits reordering of the access transactions before the access transactions are sent to respective ones of the transaction destinations. Such a reorder buffer permits more efficient use of the interconnect circuitry as the stalling of individual access transactions does not necessarily prevent progress being achieved with other access transactions.

Viewed from another aspect the present invention provides an interconnect circuitry for communicating access transactions between one or more transaction sources and one or more transaction destinations, said interconnect circuitry comprising:

buffer means for buffering and for permitting reordering of a plurality of access transactions received from said one or more transaction sources before said plurality of access transactions are sent to respective ones of said one or more transaction destinations;

hazard checking means coupled to said buffer means for performing one or more hazard checks upon said plurality of access transactions buffered within said buffer means such that at least some of said plurality of access transactions are constrained to issue from said buffer means in accordance with a predetermined order within said at least some of said plurality of access transactions; and snoop means for performing snoop operations to manage coherence between data values stored within a plurality of cache memories coupled to said interconnect circuitry, said snoop means issuing at least some snoop requests in a given order and operating such that corresponding snoop responses are returned from said snoop means in said given order;

wherein said snoop means issues a snoop request for a given access transaction to said cache memory in parallel with said hazard checking means at least performing said one or more hazard checks for said given access transaction.

Viewed from a further aspect the present invention provides a method of operating interconnect circuitry for communicating access transactions between one or more transaction sources and one or more transaction destinations, said method comprising the steps of:

within a buffer circuitry, buffering and permitting reordering of a plurality of access transactions received from said one or more transaction sources before said plurality of access transactions are sent to respective ones of said one or more transaction destinations;

performing one or more hazard checks upon said plurality of access transactions buffered within said buffer circuitry such that at least some of said plurality of access transactions are constrained to issue from said buffer circuitry in accordance with a predetermined order within said at least some of said plurality of access transactions; and performing snoop operations to manage coherence between data values stored within a plurality of cache memories coupled to said interconnect circuitry by issuing at least some snoop requests in a given order and operating such that corresponding snoop responses are returned by said snoop operations in said given order;

wherein said issuing of a snoop request for a given access transaction to said cache memory occurs in parallel with at least said performing of said one or more hazard checks for said given access transaction.

The present techniques may also be used as part of a system-on-chip integrated circuit which includes one or more transaction sources and one or more transaction destinations as well as the interconnect circuit in accordance with the above techniques. The interconnect circuitry may also be separately provided to the transaction sources and the transaction destinations.

BRIEF DESCRIPTION OF THE DRAWINGS

Embodiments of the invention will now be described, by way of example only, with reference to the accompanying drawings in which.

DESCRIPTION OF EXAMPLE EMBODIMENTS

Figure 1:
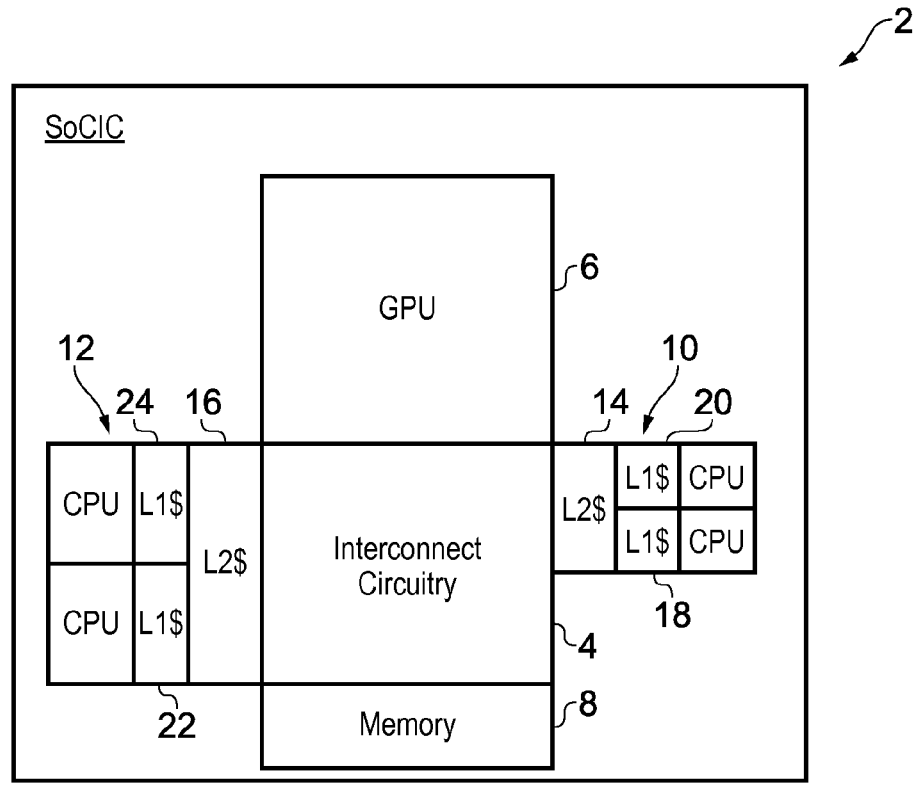
FIG. 1 schematically illustrates a system-on-chip integrated circuit including a plurality of transaction sources and a plurality of transaction destinations.

FIG. 1 schematically illustrates a system-on-chip integrated circuit 2 including a plurality of transaction sources and a plurality of transaction destinations connected via interconnect circuitry 4. The transaction sources and the transaction destinations may be the same circuit entities, i.e. a circuit entity may in some circumstances serve as a transaction source and in other circumstances serve as a transaction destination. The example system-on-chip integrated circuit 2 includes a graphics processing unit 6, a memory 8 and two clusters of processors 10, 12 each including respective level 2 caches 14, 16 and level 1 caches 18, 20, 22, 24.

The interconnect circuitry 4 is coherent interconnect circuitry supporting a coherent access transaction protocol, such as the ACE protocol developed by ARM Limited of Cambridge, England.

Within the context of such coherent interconnect circuitry 4, it is necessary to perform various different types of hazard checking, such as point-of-serialisation checking, identifier reuse checking, data coherency checking (cache snooping), etc. Performing these checks to ensure hazards such as ordering hazards are avoided increases access transaction latency and consumes energy.

It will be appreciated that the embodiment of FIG. 1 illustrates a system-on-chip integrated circuit 2 in which the interconnect circuitry 4 and the various transaction sources and transaction destinations are all provided on a single integrated circuit. However, it will be appreciated that in other embodiments the interconnect circuitry 4 may be separately provided. The interconnect circuitry 4 may also be provided in a form which is then subsequently combined with other elements to form part of a system-on-chip integrated circuit.

Figure 2:
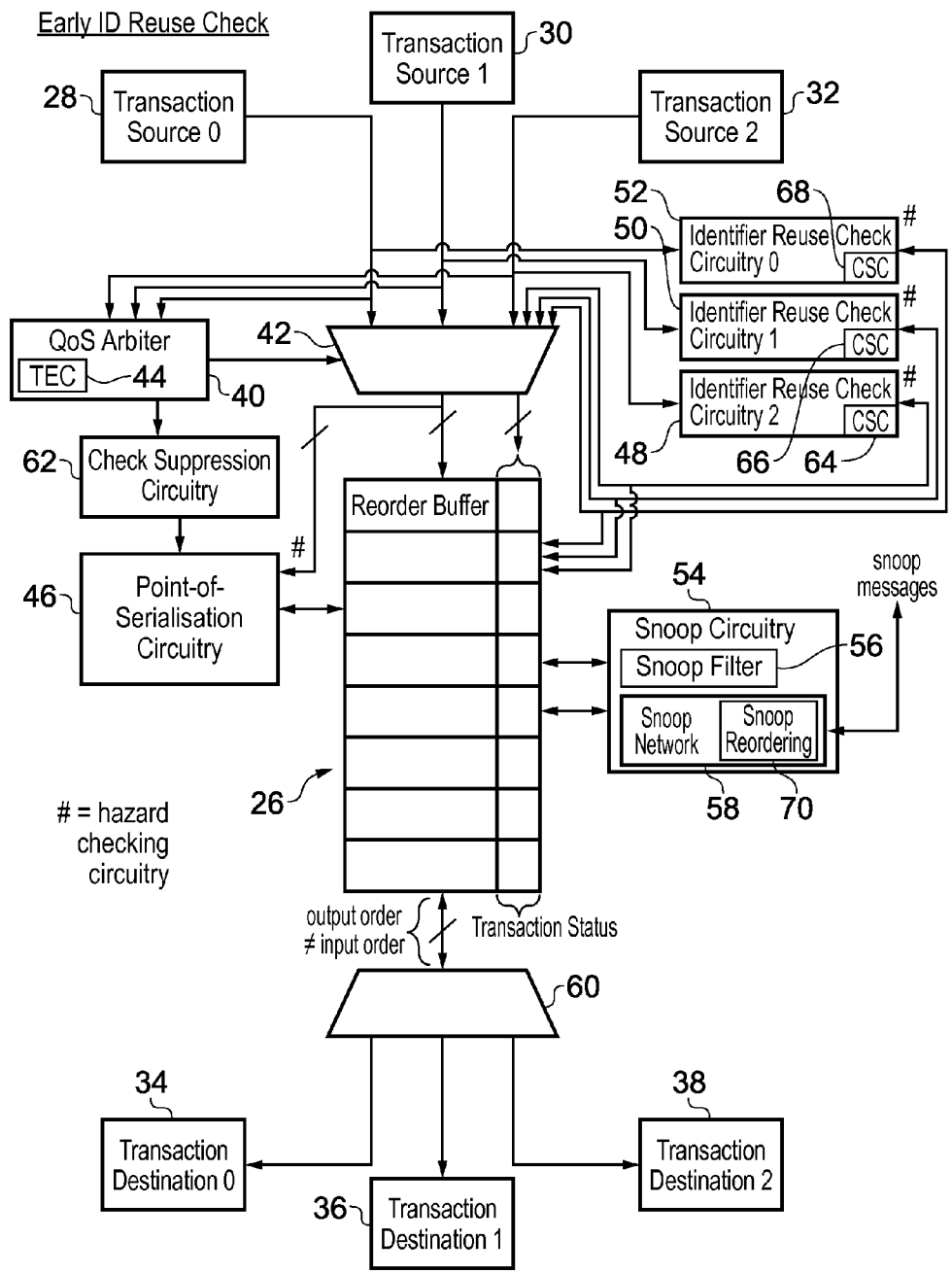
FIG. 2 schematically illustrates a portion of interconnect circuitry incorporating hazard checking circuitry providing an early identifier reuse check.

FIG. 2 schematically illustrates a portion of the interconnect circuitry 4 including a reorder buffer 26 provided between a plurality of transaction sources 28, 30, 32 and a plurality of transaction destinations 34, 36, 38. A quality-of-service arbitrator 40 is provided to control a multiplexer 42 which grants a right to add an access transaction to the reorder buffer 26 to a selected one of the transaction sources 28, 30, 32 at a given time. The quality-of-service arbiter 40 includes a total-entry counter 44 serving to keep a count of the total number of access transactions currently having corresponding entries stored within the reorder buffer 26.

The circuitry of FIG. 2 also includes hazard checking circuitry in the form of point-of-serialisation circuitry 46 and three instances of identifier reuse check circuitry 48, 50, 52 respectively provided to check for identify reuse for each of the transaction sources 28, 30, 32. The system also includes snoop circuitry 54 which includes a snoop filter 56 for determining whether or not snoop messages need to be issued and a snoop network circuit 58 for subsequently managing such snoop messages (snoop requests and snoop responses) when necessary. The snoop messages are directed to the various cache memories 14, 16, 18, 20, 22, 24 of FIG. 1.

The output from the reorder buffer 26 passes via a demultiplexer 60 to a respective one of the transaction destinations 34, 36, 38. The reorder buffer 26 serves the function of allowing the order in which transaction requests are issued from the reorder buffer 26 to differ from the order in which those transaction requests (access transactions) are added to the reorder buffer 26. This reordering facilitates more efficient use of the interconnect circuitry 4 and of the system-on-chip integrated circuit 2 as a whole.

The circuitry of FIG. 2 further includes check suppression circuitry 62, 64, 66, 68 which serves to suppress hazard checking by one or both of the point-of-serialisation circuitry 46 and the identify and reuse check circuitry 48, 50, 52 in dependence upon state variables which depend upon access transactions other than the access transaction for which the hazard check is to be suppressed. As an example, if it is known that there are no other access transactions currently buffered within the reorder buffer 26 from any of the transaction sources 28, 30, 32, then the check suppression circuitry 62 may suppress the point-of-serialisation check which would otherwise be performed by the point-of-serialisation circuitry 46 for an access transaction newly added to the reorder buffer 26. The total-entry counter 44 maintained within the arbiter 40 may be used to indicate to the check suppression circuitry 62 that the reorder buffer 26 is currently empty, i.e. there are no existing entries within the reorder buffer 26 when a new entry is added for which point-of-serialisation check suppression is appropriate.

The respective instances of check suppression circuitry 64, 66, 68 associated with each of the instances of identifier reuse check circuitry 48, 50, 52 serve to maintain a per-source entry count using a per-source entry counter that is part of the check suppression circuitry 64, 66, 68 and counts the number of entries currently buffered within the reorder buffer 26 for a given corresponding one of the transaction sources 28, 30, 32. The per-source-entry counters may also be provided in other embodiments as part of the arbiter 40 as they may also be used within the arbitration performed by the arbiter 40.

The identifier reuse check circuitry 48, 50, 52 of FIG. 2 performs at least part of its identify reuse check before an access transaction is added to the reorder buffer 26, e.g. at least in respect of transaction source identifiers. Each access transaction may have a transaction source identifier added to it by the transaction source 26, 30, 32 as it is generated and a role of the identifier reuse check circuitry 52 is to ensure that access transactions which share a source identifier are issued from the reorder buffer 26 in the same order that they were issued from their transaction source 28, 30, 32. The access transactions may also have a destination identifier associated with them within the reorder buffer 26. This destination identifier may be determined from the memory address associated with the access transaction by the identifier reuse check circuitry 48, 50, 52. In some embodiments the ordering which is enforced by the identifier reuse check circuitry 48, 50, 52 is one where the ordering of receipt matches the ordering of issue for access transactions which share both a common source identifier and a common destination identifier. Access transactions which share a source identifier, but have different destination identifiers, need not be maintained in any particular relative order as they may not give rise to a conflict.

In the example of FIG. 2, the identifier reuse check in respect of the transaction source identifiers is performed before the access transactions are added to the reorder buffer 26 and flag data forming part of transaction status data indicating whether or not that portion of the identifier reuse check has been passed or failed is added to the entry for an access transaction as it is written into the reorder buffer 26 via the multiplexer 42. Subsequent portions of the identifier reuse check, such as whether or not access transactions which share a common source identifier also share a common destination identifier, may be performed by the identifier reuse check circuitry 48, 50, 52 after the access transaction has been entered into the reorder buffer 26.

It will be appreciated that the action of the check suppression circuitry 62, 64, 66, 68 may be to suppress either or both of the point-of-serialisation check and the identifier reuse check. This suppression is performed based upon one or more state variables (e.g. count values) in respect of other of the access transactions which are handled. Thus, whether or not a given access transaction is subject to a given hazard check may be controlled not by a property of the given access transaction itself, but rather by properties associated with other transactions within the system, e.g. namely whether other transactions are wholly absent and/or absent in respect of the same transaction source or the same pair of transaction source and transaction destination.

The point-of-serialisation check performed by the point-of-serialisation circuitry 46 is to maintain an ordering of transaction access to a given memory region within the memory address space of the memory 8 such that access transactions that are directed to memory addresses that at least partially overlap the given memory access region have a predetermined ordering enforced. This predetermined ordering may correspond to an order of issue of the access transactions by their respective transaction sources, 28, 30, 32 so as to match the programmers model view or in other embodiments may be based upon factors such as priority.

The snoop circuitry 54 performs data coherency control in respect of different copies of a data value from a given memory address stored at different points within the system-on-chip integrated circuit 2. In order to achieve such coherency control, the snoop filter 56 performs a check upon a memory address of an access transaction to determine whether or not the data value at that memory address is held in one or more cache memories within the system. If the snoop filter 56 provides a hit, then the snoop network circuitry 58 generates snoop requests and receives snoop responses in accordance with conventional snoop protocols in order to manage the coherence. Such snoop protocols will be familiar to those in this technique field and will not be described further herein.

The snoop network circuitry 58 includes snoop reordering circuitry 70 which permits the reordering of snoop responses received from one or more of the cache memories so that these match a given order associated with the snoop requests. This given order may, for example, be the order in which the snoop requests are issued, or should be issued, in accordance with the programmers view of the operation of the system.

In order to speed up the operation of the interconnect circuitry 4, the snoop network circuitry 58 can operate in parallel with at least some of the hazard checking circuitry which performs the point-of-serialisation check and/or the identifier reuse check. The snoop operations typically take several cycles before the snoop responses are returned.

Starting these snoop operations speculatively before the hazard checks are passed helps to hide some of this latency. If a hazard check is not passed, then the snoop response may be stalled within the snoop network circuitry 58 until the hazard has been cleared by performing the hazard check again. The snoop reorder circuitry 70 permits other snoop responses which are not connected with the stalled snoop response (have no requirement to maintain an order therewith) to overtake and so permit forward progress within the processing of the system. Snoop responses which are stalled behind snoop responses which fail their hazard check may be snoop responses to the same cache memories as these will typically need to be processed in order.

The hazard checking which is performed in parallel with the snoop operations may conveniently be the identifier reuse check performed by the identifier reuse check circuitry 48, 50, 52.

The reorder buffer 26 can be considered to perform the function of storing an access transaction and maintaining transaction status information for that access transaction which tracks the access transaction as it progresses through the interconnect circuitry 4. The hazard checking mechanisms and data coherency mechanisms serve to ensure appropriate data consistency. Individual access transactions are checked by these mechanisms. If an individual access transaction fails one of these checks, then the checks may be rerun at a later time. A property of the system of FIG. 2 and the use of the reorder buffer 26 is that if a given access transaction fails one of its checks, then those checks may be rerun at a later time, e.g. an ordering hazard may be repaired by cancelling the operation that failed and then repeating the check operation. Hazard detection and repair circuitry formed as part of the point-of-serialisation circuitry 46 and the identifier reuse check circuitry 48, 50, 52 may control such repair by detecting the hazard and then cancelling and repeating the check.

The processing of other access transactions held within the reorder buffer 26 is independent of the cancelling and then repeating of the processing operations (hazard checks) performed for an access transaction which fails those checks. This has the result that speculatively performing a plurality of processing operations in parallel where there is a small probability that they must be performed in a serial fashion if they are to pass their hazard checks may produce an overall advantage in system performance as the overhead associated with cancelling and then repeating the processing operations which fail the ordering hazard checks is outweighed by the gain achieved by the more likely outcome that the processing operations can successfully proceed in parallel. In the context of FIG. 2, a plurality of processing operations which may be permitted to proceed in parallel, and which will not give rise to an ordering hazard in many cases, are a point-of-serialisation check performed by the point-of-serialisation circuitry 46 and at least some of the identifier reuse checks performed by the identifier reuse check circuitry 48, 50, 52.

Figure 3:
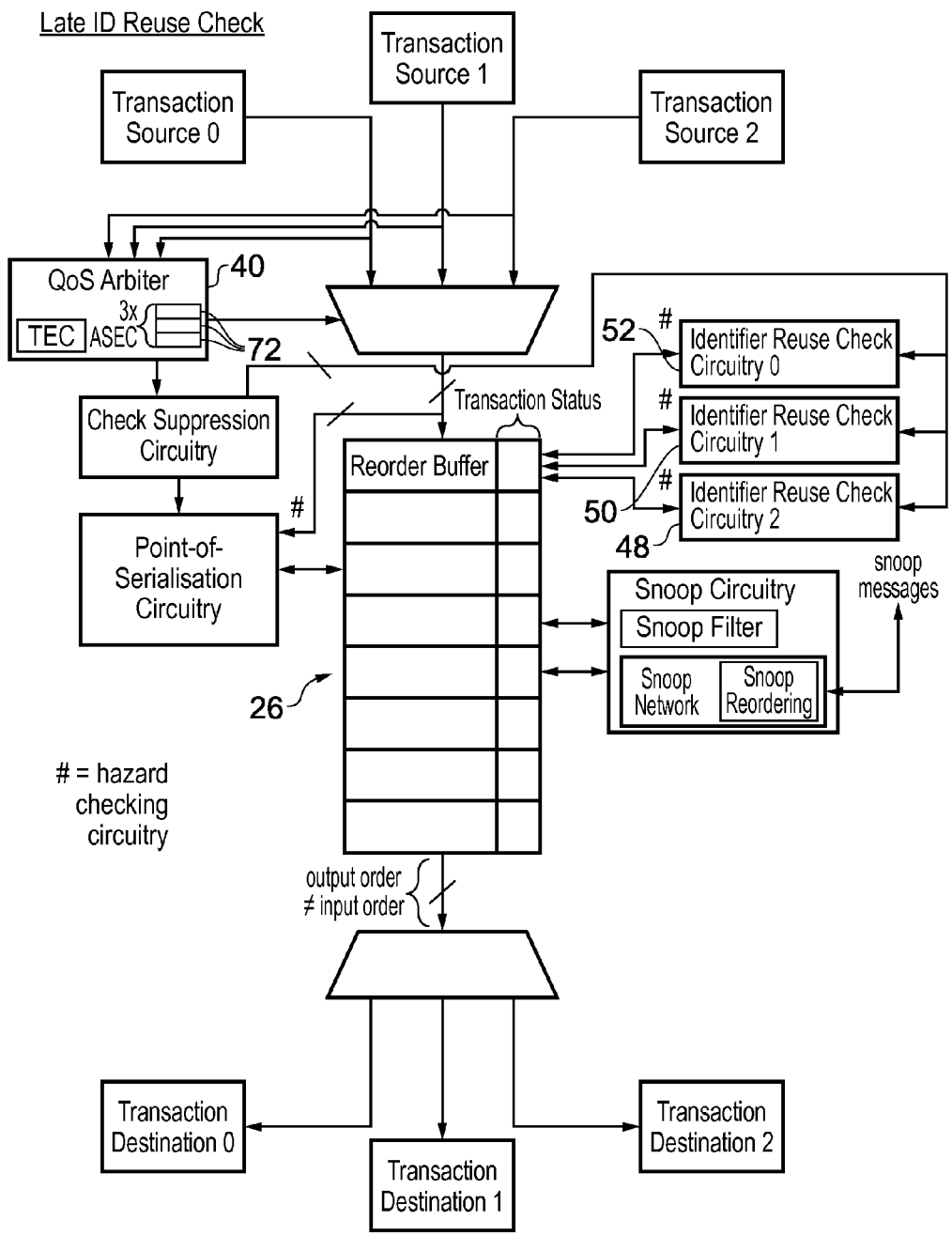
FIG. 3 schematically illustrates a second embodiment similar to that of FIG. 2 but in this case providing late identifier reuse checking.

FIG. 3 illustrates a second example embodiment of part of the interconnect circuitry 4. Compared with the embodiment of FIG. 2, the identifier reuse check circuitry 48, 50, 52 has been altered such that it now performs a later identifier reuse check, namely the checks are all performed after the access transaction has entered the reorder buffer 26. In the example of FIG. 3, the arbiter 40 includes the per-source-entry counters 72 and uses these as part of its arbitration to maintain an appropriate quality-of-service for the different transaction sources as may be required.

Figure 4:
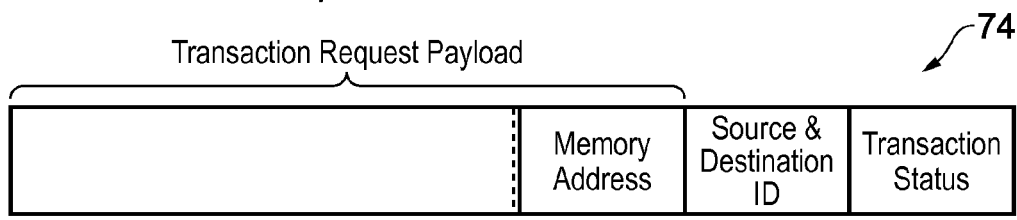
FIG. 4 schematically illustrates a reorder buffer entry.

FIG. 4 schematically illustrates one example of an entry 74 within the reorder buffer 26. An entry includes a transaction request payload, such as the memory address and data to be written in the case of a write request, or perhaps just the read address in respect of a read transaction. Also included within the entry 74 are source and destination identifiers. The source identifier may be provided by the transaction source 28, 30, 32. The destination identifier may be derived from the memory address. The entry 74 also includes transaction status data. This transaction status data may include flags indicating whether various hazard checks have been passed for a given entry. Thus, as the point-of-serialisation check and the identifier-reuse check are performed and passed, this may be marked by the setting of appropriate pass flags within the transaction status entry. Other transaction status attributes may also be included, such as whether a given access transaction associated with a given entry is a shareable transaction. If an access transaction is not sharable, then it generally can be allowed to proceed without the various hazard checks being performed upon it as these hazards do not arise for non-shareable transactions.

Figure 5:
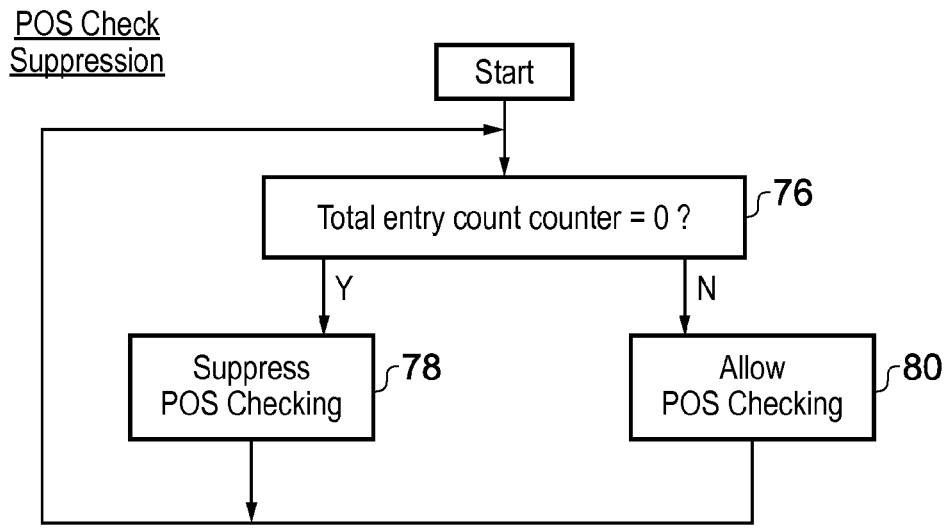
FIG. 5 is a flow diagram schematically illustrating point-of-serialisation check suppression.

FIG. 5 is a flow diagram schematically illustrating point-of-serialisation check suppression as performed by the check suppression circuitry 62. At step 76 a determination is made as to whether the current value of the total-entry count counter 44 is zero. If the value is zero, then step 78 serves to suppress point-of-serialisation checking by the point-of-serialisation circuitry 46 as this is not required since there are no buffered access transactions within the reorder buffer 26. If the test at step 76 is that the total-entry count is not currently zero, then step 80 serves to allow point-of-serialisation checking to be performed in its normal way and at its normal point within the sequence of checks performed.

Figure 6:
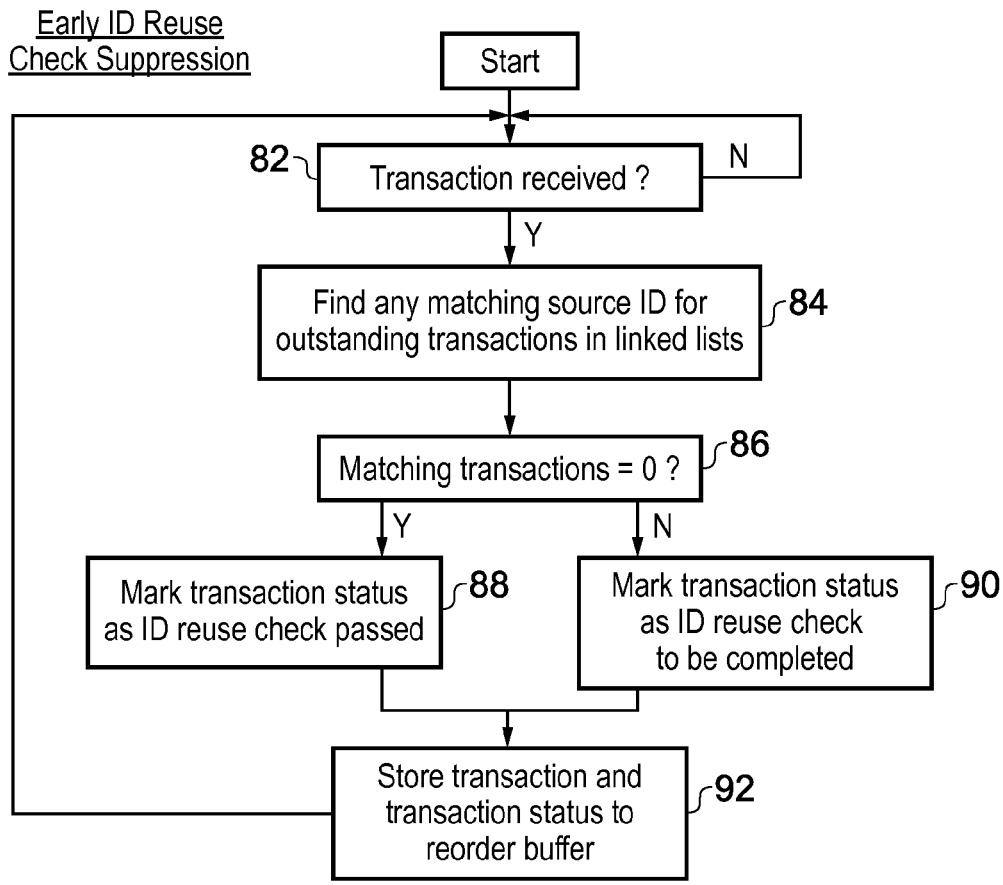
FIG. 6 is a flow diagram schematically illustrating early identifier reuse check suppression.

FIG. 6 is a flow diagram schematically illustrating suppression of an early identifier reuse check. At step 82 processing waits for a transaction to be received. Step 84 then finds any matching access transactions within linked lists of access transactions maintained by the identifier reuse check circuitry 48, 50, 52 to determine if any other access transactions have the same source identifier. Step 86 determines whether or not the number of matching transactions is zero. If the number of matching transactions is zero, then step 88 marks the transaction status as identifier-reuse check as passed at least in respect of the source identifiers as this access transaction is added into the reorder buffer 26 via the multiplexer 42. If the number of matching transactions determined at step 86 is not zero, then step 90 serves to mark the transaction status for the access transaction being added to indicate that the identifier reuse check has yet to be completed, e.g. it can be rerun as a more accurate (but slower hazard check) at a later time which may be passed or by which later time the hazard may have cleared. Step 92 stores the transaction and the transaction status into the reorder buffer 26.

Figure 7:
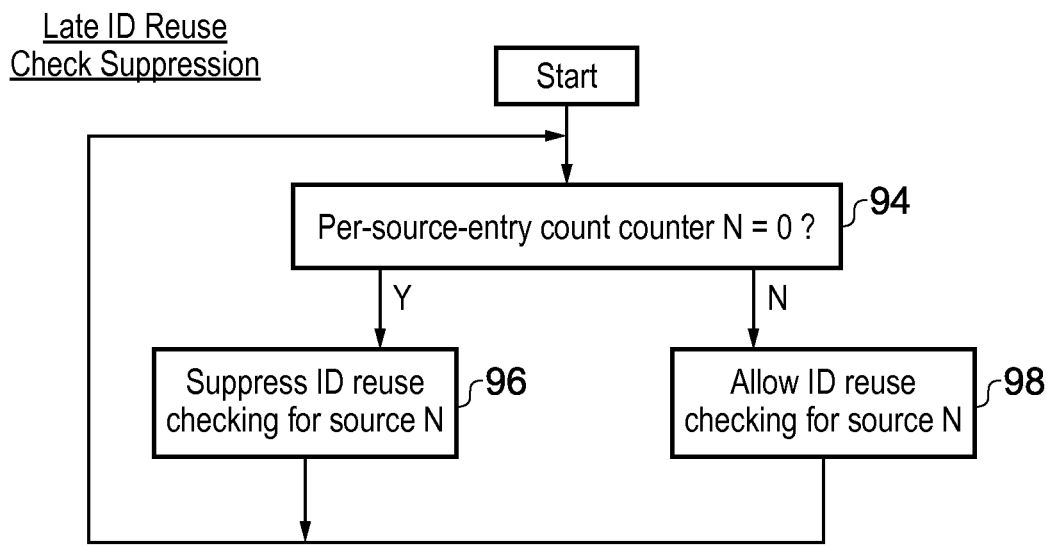
FIG. 7 is a flow diagram schematically illustrating late identifier reuse check suppression.

FIG. 7 schematically illustrates late identifier reuse check suppression in accordance with the embodiment of FIG. 3. The processing of FIG. 6 is in accordance with the embodiment of FIG. 2. In FIG. 7 step 94 performs a check as to whether the per-source-entry-count value for a particular source is currently zero. If this count value is zero, then step 96 serves to suppress identifier reuse checking by the corresponding one of the identifier reuse check circuitry 48, 50, 52. Conversely, if the determination at step 94 is that the per-source-entry count for the transaction source concerned is not zero, then step 98 serves to permit identifier reuse checking to be performed for that source.

Figure 8:
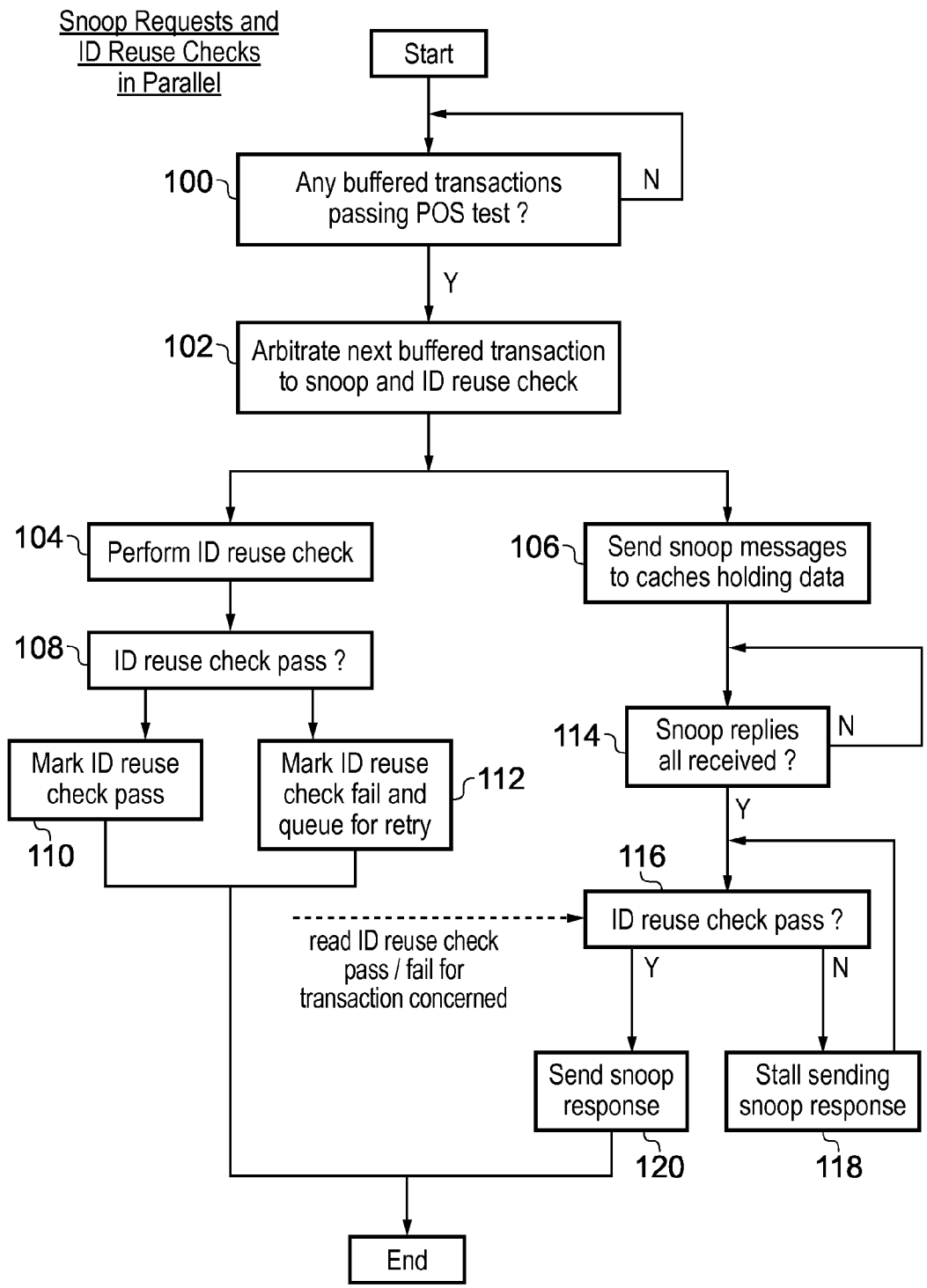
FIG. 8 is a flow diagram schematically illustrating the operation of the circuitry of FIGS. 2 and 3 in embodiments in which snoop requests and identifier reuse checks are performed in parallel.

FIG. 8 is a flow diagram schematically illustrating processing of the embodiments of FIGS. 2 and 3 as they serve to perform snoop processing and identifier reuse checking in parallel. At step 100, processing waits until a determination is made that there are buffered access transactions within the reorder buffer 26 that have passed their point-of-serialisation check, but have yet to have had their identifier reuse checking or snoop checks completed. If there are such buffered transactions, then step 102 serves to arbitrate to select the appropriate next one of these to be subject to snoop and identifier reuse checking. Following step 102, processing proceeds to initiate in parallel an identifier reuse check at step 104 and the issuing of snoop messages to caches holding the data item at step 106. Thereafter, parallel identifier reuse checking and snoop message processing is performed. Following step 104, step 108 serves to determine whether or not the identifier reuse check has been passed. If the identifier reuse check has been passed, then it is marked as check passed at step 110. If the identifier reuse check has not been passed, then this is marked as check failed at step 112 and is queued for retrying by the identifier reuse check.

Following the sending of the snoop messages at step 106, step 114 waits until snoop replies have been received for the access transaction from all the cache memories to which snoop requests were sent. When all such snoop replies have been received, then step 116 determines whether the identifier reuse check has also been passed. This may be determined by reading the appropriate flag within the transaction status for the access transaction concerned as held within the reorder buffer 26. If the transaction status indicates that the identifier reuse check has not yet been passed, then step 118 serves to stall sending the snoop response until the identifier reuse check has been passed. When the identifier reuse check has been passed, then step 120 serves to send the snoop response for the snoop replies which were all received at step 114. It will be appreciated that the snoop reordering circuitry 70 permits other snoop responses which do not need to have their order constrained relative to a stall response stalled at step 118 to be returned despite the stalling of the snoop response at step 118. These other snoop responses which may be reordered include snoop responses to cache memories distinct from the cache memories to which snoop messages were sent at step 110 and for which the snoop response is stalled at step 118.

Figure 9:
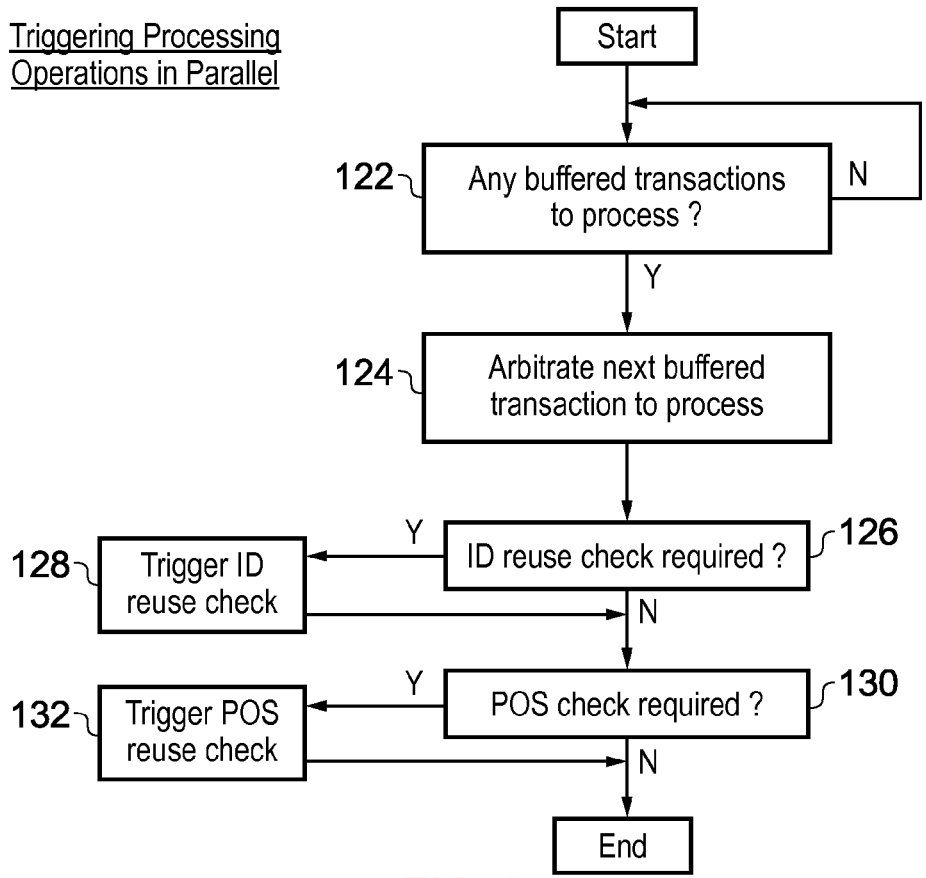
FIG. 9 is a flow diagram schematically illustrating processing operations in respect of access transactions within a reorder buffer being processed in parallel.

FIG. 9 is a flow diagram schematically illustrating the operation of the circuits of FIGS. 2 and 3 in triggering of the performing parallel processing operations upon access transactions stored within the reorder buffer 26. These processing operations may be hazard checks, such as point-of-serialisation checks and identifier reuse checks. At step 122 processing waits until there are some buffered transactions which need to be processed by one or more of the processing operations which can operate in parallel. When there are such buffered transactions to be processed, then step 124 serves to arbitrate to select the next of these to be processed. Step 126 then determines whether an ID reuse check is required to be performed in respect of the access transaction concerned. This may be determined by reading the appropriate transaction status information for the entry. If a ID reuse check is required, then step 128 triggers such an ID reuse check to be initiated. It will be appreciated that identifier reuse checking may be a multi-stage processed with, for example, a check first being made concerning source identifier reuse and a subsequent check then being made as necessary for destination identifier reuse. It will be familiar to those in this technical field that various levels of identifier reuse checking may be required in order to avoid ordering hazards such as out-of-order processing and/or deadlock conditions arising due to undesired re-orderings. Once initiated, this ID reuse check can proceed to be processed in parallel with another processing operation that has been initiated.

Step 130 determines whether or not a point-of-serialisation check is required for the access transaction being processed. This again may be determined by reading the appropriate transaction status flags. If the determination at step 130 is that a point-of-serialisation check is to be performed, then step 132 serves to initiate such an identifier reuse check. This point-of-serialisation check may proceed in parallel with an ID reuse check initiated at step 128.

Figure 10:
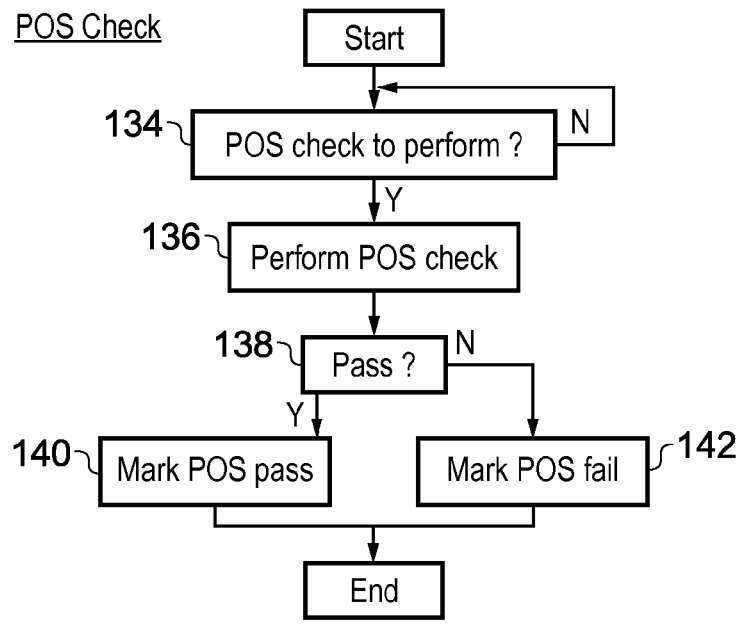
FIG. 10 is a flow diagram schematically illustrating a point-of-serialisation check.

FIG. 10 is a flow diagram schematically illustrating a point-of-serialisation check. Step 134 determines whether or not a point-of-serialisation check is required. This can correspond to whether or not step 32 of FIG. 9 has triggered such a check to be performed. When such a check is required, then step 136 performs this check and step 138 determines whether or not it has passed. If the check has been passed, then this is marked as such within the transaction status flags at step 140. If the check has been failed, then this is marked as such within the transaction status flags at step 142 whereupon it can be rerun at a later time. The point-of-serialisation check compares (at least part of) the address of the transaction being checked will the addresses of all of the buffered transactions on which this check has already been performed. If there is no match, then the point-of-serialisation check passes.

Figure 11:
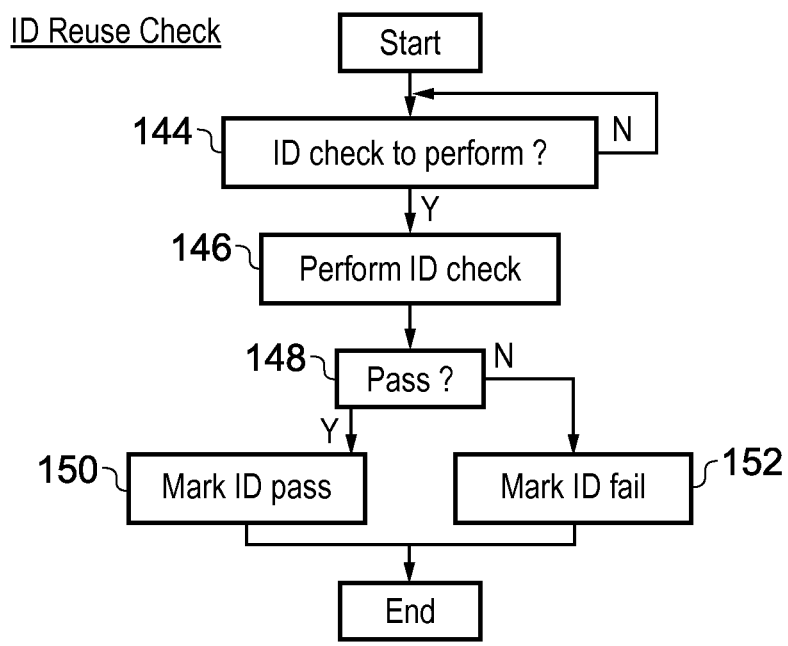
FIG. 11 is a flow diagram schematically illustrating an identifier reuse check.

FIG. 11 is a flow diagram schematically illustrating an identifier reuse check. The processing is similar to that of FIG. 10. At step 144 a determination is made as to whether or not there is an identifier reuse check to perform. This can correspond to whether or not an identify reuse check has been triggered at step 28 of FIG. 9. When there is such an identifier reuse check to perform, then step 146 performs this check and step 148 determines whether or not it was passed. If the check was passed, then step 150 marks the check as passed (or at least the phase of the check concerned as passed) within the transaction status flags. Alternatively, step 152 serves to mark the identifier reuse check (or phase thereof) as failed whereupon it can be rerun at a later time.

In the example of FIGS. 9, 10 and 11 the point-of-serialisation and the ID reuse checks can be performed in parallel. If the point-of-serialisation check passes and the ID reuse check fails, the both checks need to be rerun. If the ID reuse check passes and the point-of-serialisation check fails, then only the point-of-serialisation check needs to be rerun.

In other embodiments the system may arbitrate between transactions whose transaction status flags indicate that they need a point-of-serialisation check and have passed their ID reuse check. In such embodiments the ID reuse check comes before the point of serialisation check as a failure of the ID reuse check would mean the point-of-serialisation check would be invalid (even if in isolation it appeared to pass).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. Interconnect circuitry for communicating access transactions between one or more transaction sources and one or more transaction destinations, said interconnect circuitry comprising:

buffer circuitry configured to buffer a plurality of access transactions received from said one or more transaction sources before said plurality of access transactions are sent to respective ones of said one or more transaction destinations;

hazard checking circuitry coupled to said buffer circuitry and configured to perform one or more hazard checks upon said plurality of access transactions buffered within said buffer circuitry such that at least some of said plurality of access transactions are constrained to issue from said buffer circuitry in accordance with a predetermined order within said at least some of said plurality of access transactions; and snoop circuitry configured to perform snoop operations to manage coherence between data values stored within a plurality of cache memories coupled to said interconnect circuitry, said snoop circuitry being configured to issue at least some snoop requests in a given order and operate such that corresponding snoop responses are returned from said snoop circuitry in said given order;

wherein said snoop circuitry includes snoop reordering circuitry configured to permit reordering of snoop responses received from one or more of said cache memories to match said given order;

said snoop circuitry is configured to issue a snoop request for a given access transaction in parallel with said hazard checking circuitry at least performing said one or more hazard checks for said given access transaction; and if said hazard checking circuitry determines that said given access transaction is not ready to be issued from said buffer circuitry in accordance with said predetermined order, then said snoop circuitry is configured to stall within said snoop circuitry said corresponding snoop response to be returned from said snoop circuitry for said given access transaction.

2. Interconnect circuitry as claimed in claim 1, wherein said stall of said corresponding snoop response includes a stall of any following snoop responses to a same cache memory.

3. Interconnect circuitry as claimed in claim 1, wherein said buffer circuitry comprises a reorder buffer configured to permit reordering of a plurality of access transactions received from said one or more transaction sources before said plurality of access transactions are sent to respective ones of said one or more transaction destinations.

4. Interconnect circuitry as claimed in claim 1, wherein an access transaction received from one of said one or more transaction sources includes a transaction source identifier set by said one of said one or more transaction sources and said hazard checking circuitry includes identifier-reuse circuitry configured to maintain an ordering of transaction issue from said buffer circuitry to match an ordering of transaction receipt at said buffer circuitry among at least access transactions that share a common value of said transaction source identifier.

5. Interconnect circuitry as claimed in claim 4, wherein an access transaction received from one of said one or more transaction sources includes a transaction destination identifier set by said one of said one or more transaction sources and said identifier-reuse circuitry is configured to maintain an ordering of transaction issue from said buffer circuitry to match an ordering of transaction receipt at said buffer circuitry among access transactions that share a common value of said transaction source identifier and share a common value of said transaction destination identifier.

6. Interconnect circuitry for communicating access transactions between one or more transaction sources and one or more transaction destinations, said interconnect circuitry comprising:

buffer means for buffering and for permitting reordering of a plurality of access transactions received from said one or more transaction sources before said plurality of access transactions are sent to respective ones of said one or more transaction destinations;

hazard checking means coupled to said buffer means for performing one or more hazard checks upon said plurality of access transactions buffered within said buffer means such that at least some of said plurality of access transactions are constrained to issue from said buffer means in accordance with a predetermined order within said at least some of said plurality of access transactions; and snoop means for performing snoop operations to manage coherence between data values stored within a plurality of cache memories coupled to said interconnect circuitry, said snoop means being configured to issue at least some snoop requests in a given order and to operate such that corresponding snoop responses are returned from said snoop means in said given order;

wherein said snoop means issues a snoop request for a given access transaction to said cache memory in parallel with said hazard checking means at least performing said one or more hazard checks for said given access transaction; and if said hazard checking means determines that said given access transaction is not ready to be issued from said buffer means in accordance with said predetermined order, then said snoop means is configured to stall within said snoop means said corresponding snoop response to be returned from said snoop means for said given access transaction.

7. A method of operating interconnect circuitry for communicating access transactions between one or more transaction sources and one or more transaction destinations, said method comprising the steps of:

within a buffer circuitry, buffering and permitting reordering of a plurality of access transactions received from said one or more transaction sources before said plurality of access transactions are sent to respective ones of said one or more transaction destinations;

performing one or more hazard checks upon said plurality of access transactions buffered within said buffer circuitry such that at least some of said plurality of access transactions are constrained to issue from said buffer circuitry in accordance with a predetermined order within said at least some of said plurality of access transactions; and performing snoop operations to manage coherence between data values stored within a plurality of cache memories coupled to said interconnect circuitry by issuing at least some snoop requests in a given order and operating such that corresponding snoop responses are returned by said snoop operations in said given order;

wherein said issuing of a snoop request for a given access transaction to said cache memory occurs in parallel with at least said performing of said one or more hazard checks for said given access transaction; and if said one or more hazard checks determine that said given access transaction is not ready to be issued from said buffer circuitry in accordance with said predetermined order, then stalling said corresponding snoop response to be returned from said snoop operations for said given access transaction.

8. A system-on-chip integrated circuit comprising:
one or more transaction sources;
one or more transaction destinations; and
interconnect circuitry as claimed in claim 1.

* * * * *